(12) United States Patent  
Larson et al.

(10) Patent No.: US 6,954,343 B2  
(45) Date of Patent: Oct. 11, 2005

(54) MAGNETORESISTIVE SENSOR HAVING LOW RESISTIVITY DUAL PATH CONDUCTOR AND OPTIMIZED MAGNETIC

(75) Inventors: David J. Larson, Northfield, MN (US); Eric W. Singleton, Greenfield, MN (US); Mai A. Ghaly, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 414 days.

(21) Appl. No.: 10/142,563

(22) Filed: May 8, 2002

(65) Prior Publication Data

US 2002/0186516 A1 Dec. 12, 2002

Related U.S. Application Data

(60) Provisional application No. 60/297,542, filed on Jun. 12, 2001.

(51) Int. Cl.[7] .................................................. G11B 5/39
(52) U.S. Cl. .................................................. 360/324.12
(58) Field of Search ........................ 360/324.12, 324.1, 360/324.11, 322, 317

(56) References Cited

U.S. PATENT DOCUMENTS

| | | | |
|---|---|---|---|
| 5,508,866 A | 4/1996 | Gill et al. | 360/113 |
| 5,528,440 A | 6/1996 | Fontana et al. | 360/113 |
| 5,742,459 A | 4/1998 | Shen et al. | 360/113 |
| 5,784,225 A | 7/1998 | Saito et al. | 360/113 |
| 5,883,764 A | 3/1999 | Pinarbasi | 360/113 |
| 5,936,810 A * | 8/1999 | Nakamoto et al. | 360/324.1 |
| 6,055,138 A | 4/2000 | Shi | 360/126 |
| 6,094,325 A | 7/2000 | Tagawa et al. | 360/113 |
| 6,219,207 B1 * | 4/2001 | Pinarbasi | 360/322 |
| 6,229,678 B1 | 5/2001 | Xue et al. | 360/327.22 |

FOREIGN PATENT DOCUMENTS

WO WO 99/16057 4/1999 ............ G11B/5/39

OTHER PUBLICATIONS

U.S. Appl. No. 10/012,829, filed Dec. 10, 2001, Seigler et al.

* cited by examiner

Primary Examiner—George J. Letscher  
(74) Attorney, Agent, or Firm—Kinney & Lange, P.A.

(57) ABSTRACT

A transducing head has a magnetoresistive sensor and a first and a second dual path conductor/magnet structure for providing current to the magnetoresistive sensor and for stabilizing the magnetoresistive sensor. The first and the second dual path conductor/magnet structures are arranged in an abutted-junction configuration on opposite sides of the magnetoresistive sensor. Each of the first and the second dual path conductor/magnet structures has at least one bias layer and at least one conductor layer. Each bias layer is formed upon a bias seed layer positioned over one of the conductor layers. Each bias seed layer is selected to result in the bias layer formed upon it having a coercivity between about 1 kOe and about 5 kOe and an in-plane remnant squareness greater than about 0.8. Most preferably, each of the first and the second dual path conductor/magnet structures is formed of at least two conductor layers interspersed with at least one bias layer.

19 Claims, 7 Drawing Sheets

MAGNETORESISTIVE SENSOR HAVING LOW RESISTIVITY DUAL PATH CONDUCTOR AND OPTIMIZED MAGNETIC

CROSS-REFERENCE TO RELATED APPLICATION(S)

This application claims priority from provisional U.S. patent application Ser. No. 60/297,542 of David James Larson and Eric Walter Singleton, filed on Jun. 12, 2001 and entitled "Magnetoresistive Sensor Having Low Resistivity Dual Path Conductor and Optimized Magnetic Layer".

BACKGROUND OF THE INVENTION

The present invention relates generally to the field of magnetic data storage and retrieval systems. More particularly, the present invention relates to a transducing head having a magnetoresistive sensor and first and second dual path conductor/magnet structures arranged in an abutted-junction configuration on opposite sides of the magnetoresistive sensor for stabilizing and for providing current to the magnetoresistive sensor.

A transducing head of a magnetic data storage and retrieval system typically includes a magnetoresistive (MR) reader portion for retrieving magnetic data stored on a magnetic media. The reader is typically formed of several layers which include an MR sensor positioned between two gap layers, which are in turn positioned between two magnetically permeable shield layers. The MR sensor may be any one of a plurality of MR-type sensors, including, but not limited to, anisotropic magnetoresistive (AMR), giant magnetoresistive (GMR), spin valve and spin tunneling sensors.

When the transducing head is placed near a magnetic medium, a resistance of the MR sensor fluctuates in response to a magnetic field emanating from written transitions in the magnetic medium. By providing a sense current through the MR sensor, the resistance of the sensor can be measured and used by external circuitry to decipher the information stored on the magnetic medium. The sense current is provided to the MR sensor via a pair of current contacts.

To operate the MR sensor properly, the sensor must be stabilized against the formation of edge domains because domain wall motion results in electrical noise that makes data recovery impossible. A common way to achieve stabilization is with a permanent magnet abutted junction configuration in which permanent magnet bias elements directly abut opposite sides of the MR sensor. Permanent magnets have a high coercive field (i.e., are hard magnets). The magnetostatic field from the permanent magnets stabilizes the MR sensor, prevents edge domain formation, and provides proper bias.

In recent years, MR sensor widths have decreased to accommodate ever-increasing areal densities of magnetic media. This decrease in MR sensor widths has resulted in increased MR sensor resistivity, which undesirably requires the new design of the external circuitry used to decipher the information stored on the magnetic medium. Thus, there is a need for a MR sensor design that allows for decreased sensor widths without increasing the MR sensor resistivity.

BRIEF SUMMARY OF THE INVENTION

A transducing head has a magnetoresistive sensor and a first and a second dual path conductor/magnet structure for providing current to the magnetoresistive sensor and for stabilizing the magnetoresistive sensor. The first and the second dual path conductor/magnet structures are arranged in an abutted-junction configuration on opposite sides of the magnetoresistive sensor. Each of the first and the second dual path conductor/magnet structures has at least one bias layer and at least one conductor layer. Each bias layer is formed upon a bias seed layer positioned over one of the conductor layers. Each bias seed layer is selected to result in the bias layer formed upon it having a coercivity between about 1 kOe and about 5 kOe and an in-plane remnant squareness greater than about 0.8. Most preferably, each of the first and the second dual path conductor/magnet structures is formed of at least two conductor layers interspersed with at least one bias layer.

DETAILED DESCRIPTION

Figure 1:
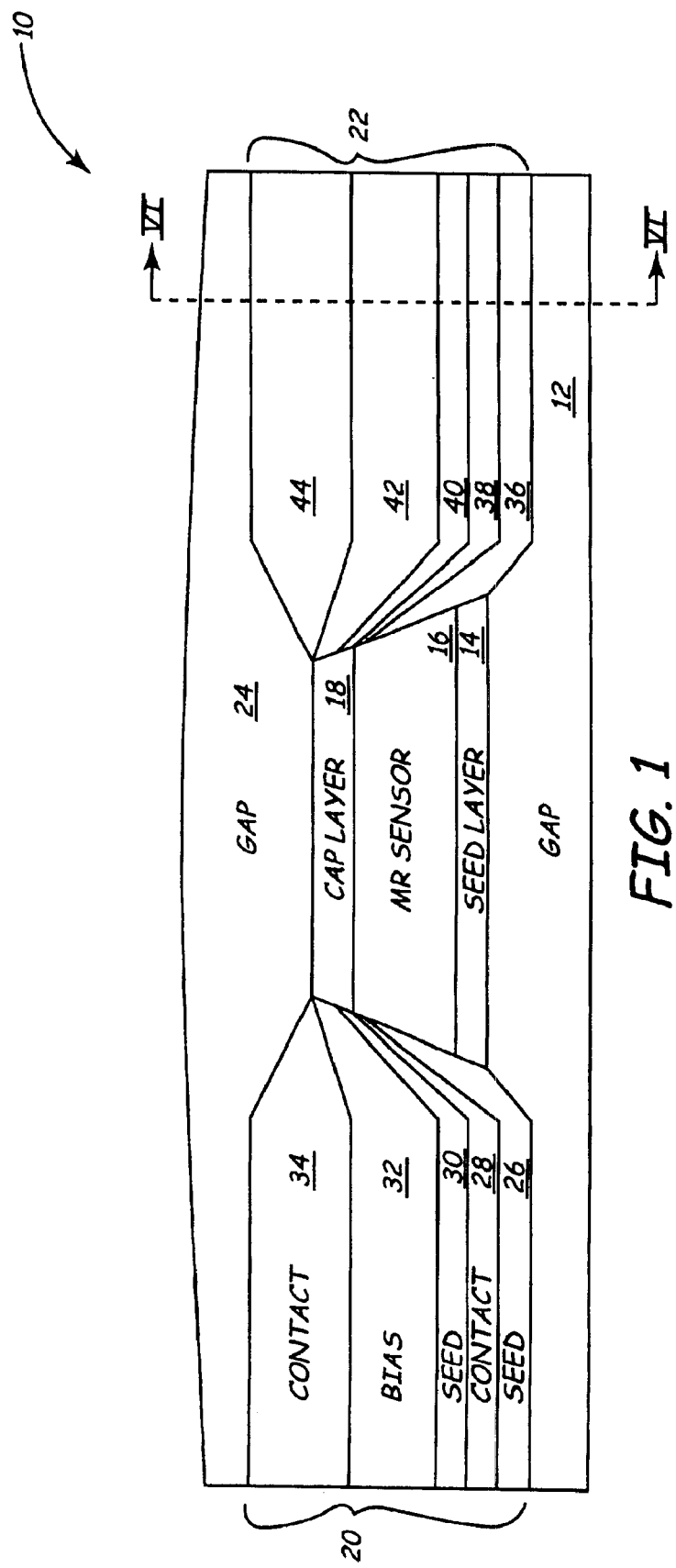
FIG. 1 is cross-sectional view of a transducing head in accord with the present invention.

FIG. 1 is a cross-sectional view of transducing head 10 in accord with the present invention. Transducing head 10 includes first gap layer 12, sensor seed layer 14, magnetoresistive (MR) sensor 16, cap layer 18, first dual path conductor/magnet structure 20, second dual path conductor/magnet structure 22 and second gap layer 24.

Sensor seed layer 14 is formed on a central region of insulating first gap layer 12. MR sensor 16 is formed on sensor seed layer 14. MR sensor 16 is a multilayer device operable to sense magnetic flux from a magnetic media (not illustrated in FIG. 1). MR sensor 16 may be any one of a plurality of MR-type sensors, including, but not limited to, anisotropic magnetoresistive (AMR), giant magnetoresistive (GMR), spin valve, and spin tunneling sensors. At least one layer of MR sensor 16 is a sensing layer, such as a free layer of a GMR spin valve sensor that requires longitudinal biasing. Cap layer 18 is positioned on MR sensor 16.

First and second dual path conductor/magnet structures 20 and 22 are arranged on end portions of first gap layer 12 in an abutted-junction configuration on opposite sides of MR sensor 16. First and second dual path conductor/magnet structures 20 and 22 function to provide current to MR sensor 16 and to provide longitudinal biasing to the sensing layer of MR sensor 16. Insulating second gap layer 24 is positioned over cap layer 18 and first and second dual path conductor/magnetic structures 20 and 22.

First dual path conductor/magnet structure 20 is sequentially formed of first contact seed layer 26, first contact 28, bias seed layer 30, bias layer 32, and second contact 34. Similarly, second dual path conductor/magnet structure 22 is sequentially formed of first contact seed layer 36, first contact 38, bias seed layer 40, bias layer 42, and second contact 44.

First contact seed layers 26 and 36 are each preferably formed of an about 50 Å to about 200 Å thick layer of a material selected to promote the texture and grain growth of each subsequently formed layer. More preferably, first contact seed layers 26 and 36 are formed of a material such as chromium, ruthenium, tantalum, titanium, tungsten or alloy based primarily of chromium, ruthenium, tantalum, titanium, and/or tungsten.

First contacts 28 and 38 are each preferably formed of an about 100 Å to about 1000 Å thick layer of a low resistivity material, such as chromium, copper, gold, rhodium, ruthenium, silver, tantalum, tungsten, or an alloy based primarily upon chromium, copper, gold, rhodium, ruthenium, silver, tantalum, and/or tungsten.

Bias seed layers 30 and 40 are each preferably formed of an about 50 Å to about 200 Å thick layer of a material selected to promote the texture and grain growth of each subsequently formed layer. More preferably, bias seed layers 30 and 40 are formed of a material such as chromium, ruthenium, tantalum, titanium, tungsten, or an alloy based primarily on chromium, ruthenium, tantalum, titanium, and/or tungsten. Alternatively, bias seed layers 30 and 40 may be formed of more than one layer, such as a multi-layer of tantalum and titanium-tungsten or a multi-layer of tantalum and chromium.

Bias layers 32 and 42 are each preferably formed of an about 100 Å to about 1000 Å thick layer of a hard magnetic material, such as cobalt-chromium-platinum, cobalt-platinum, or an alloy based primarily upon cobalt-chromium-platinum and/or cobalt-platinum.

Second contacts 34 and 44 are each preferably formed of an about 50 Å to about 2000 Å thick layer of a low resistivity material, such as chromium, copper, gold, rhodium, ruthenium, silver, tantalum, tungsten, or an alloy based primarily upon chromium, copper, gold, rhodium, ruthenium, silver, tantalum, and/or tungsten. In a first alternate embodiment of the present invention, first and second dual path conductor/magnet structures 20 and 22 do not include second contacts 34 and 44.

Figure 2:
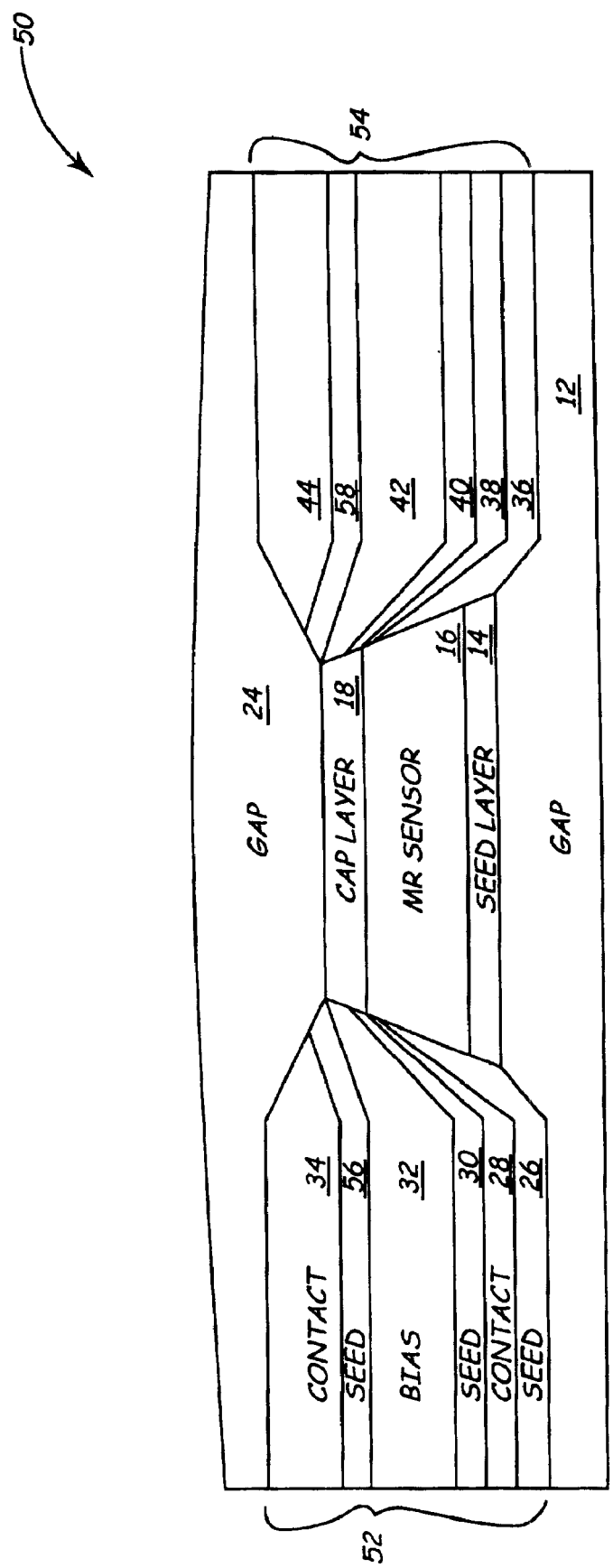
FIG. 2 is a cross-sectional view of a transducing head in accord with an alternate embodiment of the present invention.

Depending upon the material selected for second contacts 34 and 44, a second contact seed layer having similar properties to first contact seed layers 26 and 36 may be used to grow second contacts 34 and 44. Accordingly, FIG. 2 is a cross-sectional view of transducing head 50 in accord with a second alternate embodiment of the present invention. Transducing head 50 is identical to transducing head 10, except that it includes first dual path conductor/magnet structure 50 having second contact seed layer 56 positioned between bias layer 32 and second contact 34 in place of first dual path conductor/magnet structure 20 and second dual path conductor/magnet structure 54 having second contact seed layer 58 positioned between bias layer 42 and second contact 44 in place of second dual path conductor/magnet structure 22. Elements common to FIGS. 1 and 2 are identically numbered.

In a third alternate embodiment of the present invention, first contact seed layer 26, first contact 28, and bias seed layer 30 of first dual path conductor/magnet structure 20 of transducing head 10 are replaced with a single layer of chromium or ruthenium. Similarly, first contact seed layer 36, first contact 38, and bias seed layer 40 of second dual path conductor/magnet structure 22 of transducing head 10 are replaced with a single layer of chromium or ruthenium.

Figure 3:
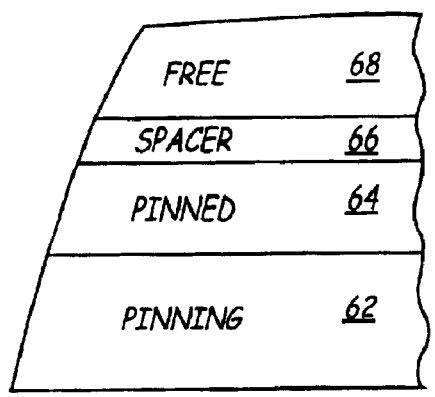
FIG. 3 is a layer diagram of a spin valve sensor configured as a bottom spin valve.
Figure 4:
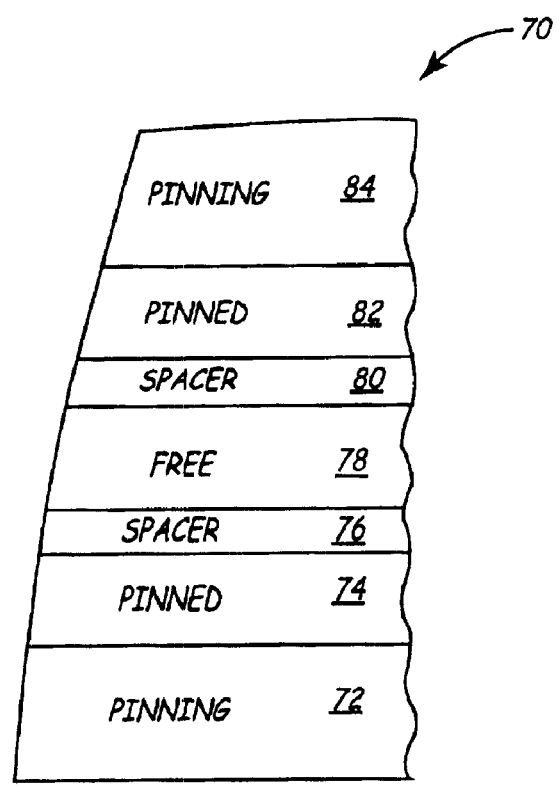
FIG. 4 is a layer diagram of a spin valve sensor configured as a dual spin valve.

Although the present invention can be used with any type of MR sensor requiring longitudinal biasing, it is particularly useful for spin valve sensors. In particular, the transducing head configuration of the present invention allows for lower resistivity pedestals for bias layers 32 and 42, the benefit of which will be described below. In a preferred embodiment, MR sensor 16 is a spin valve sensor. FIGS. 3 and 4 show examples of two different spin valve sensors which may be used with the present invention.

FIG. 3 is a layer diagram of spin valve sensor 60 configured as a bottom spin valve. GMR sensor 60 is a multi-layered device having pinning layer 62, pinned layer 64, spacer layer 66, and free layer 68. Pinning layer 62 is formed adjacent to pinned layer 64 to fix a magnetization of pinned layer 64. Spacer layer 66 is positioned between pinned layer 64 and free layer 68 to decouple the magnetizations thereof. Pinned layer 64 is positioned between pinning layer 62 and spacer layer 66.

Pinning layer 62 is preferably formed of an antiferromagnetic material. Pinned layer 64 and free layer 68 are each preferably formed of ferromagnetic materials, and spacer layer 66 is preferably a thin layer of a nonmagnetic material. Each of the layers of spin valve 60, in turn, can be formed of multiple layers as is well known in the art of magnetoresistive sensor design.

The magnetization of pinned layer 64 is fixed in a predetermined direction while the magnetization of free layer 68 rotates freely in response to an external magnetic field emanating from a magnetic medium. The magnetization of pinned layer 64 is pinned by exchange coupling pinning layer 62 with pinned layer 64. A resistance of spin valve 60 varies as a function of an angle that is formed between the magnetization of free layer 68 and the magnetization of pinned layer 64.

FIG. 4 is a layer diagram of a spin valve sensor 70 configured as a dual spin valve. Spin valve sensor 70 is a multi-layered device having first pinning layer 72, first pinned layer 74, first spacer layer 76, free layer 78, second spacer layer 80, second pinned layer 82, and second pinning layer 84. First pinning layer 72 is formed adjacent to first pinned layer 74 to fix a magnetization thereof. Second pinning layer 84 is similarly formed adjacent to second pinned layer 82. Free layer 78 is positioned between first and second pinned layers 74 and 82 such that first spacer layer 76 separates first pinned layer 77 from free layer 78 and second spacer layer 80 separates free layer 78 from second pinned layer 82. First and second spacer layers 76 and 80 serve to decouple free layer 78 from first and second pinned layers 74 and 82.

First and second pinning layers 72 and 84 are each preferably formed of antiferromagnetic materials. First and second pinned layers 74 and 82 and free layer 78 are each preferably formed of ferromagnetic materials. First and second spacer layers 76 and 80 are each preferably thin layers of nonmagnetic materials. Each of the layers of spin valve 70 can be in turn formed of multiple layers.

The magnetization of each of first and second pinned layers 74 and 82 are fixed in predetermined directions, preferably parallel to each other, while the magnetization of free layer 78 rotates freely in response to an external magnetic field emanating from a magnetic medium. The magnetization of first pinned layer 74 is pinned by exchange coupling first pinning layer 72 with first pinned layer 74. The magnetization of second pinned layer 82 is pinned by exchange coupling second pinning layer 84 with second pinned layer 82. A resistance of spin valve sensor 70 varies as a function of the angles that are formed between the magnetization of free layer 78 and the magnetizations of first and second pinned layers 74 and 82.

Figure 5:
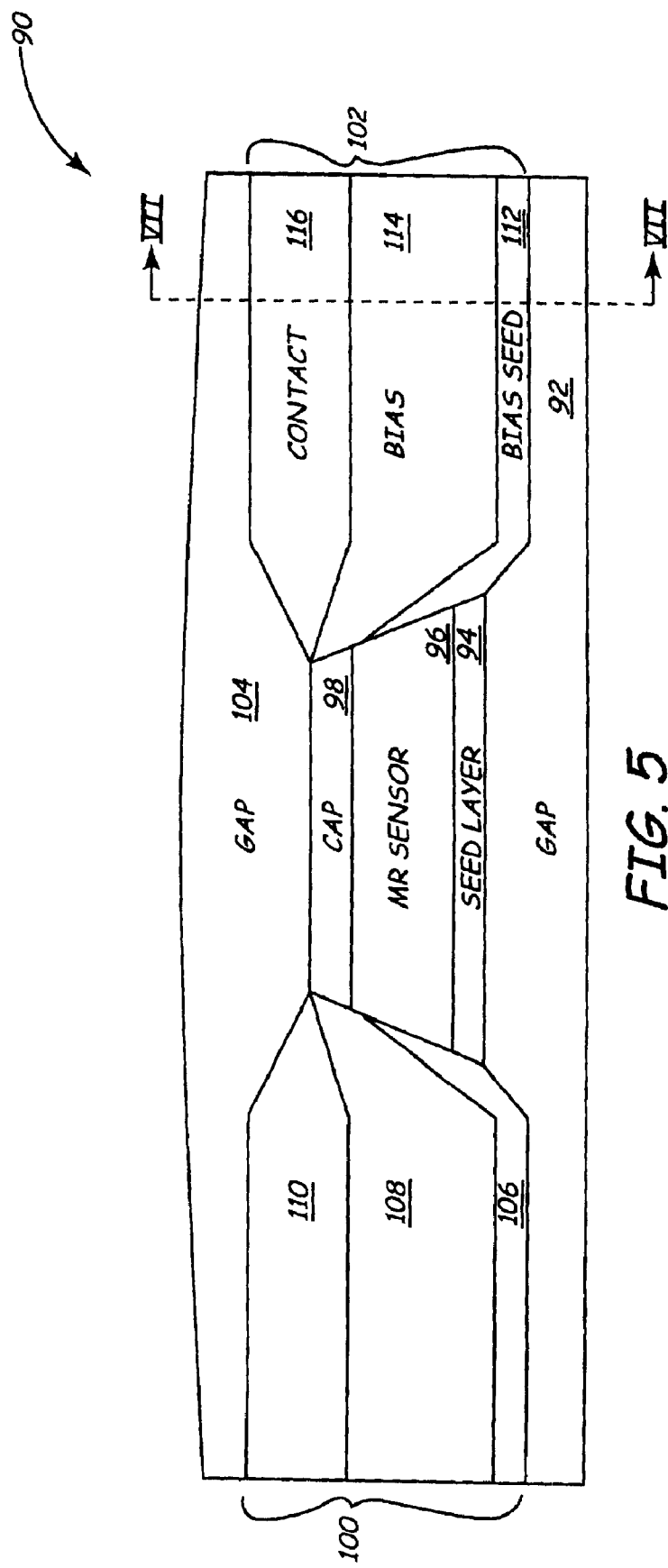
FIG. 5 is a cross-sectional view of a prior art transducing head.

To appreciate the advantages presented by the present invention over the prior art, one must first understand the problems associated with prior art designs. FIG. 5 is a cross-sectional view of prior art transducing head 90. Transducing head 90 includes first gap layer 92, sensor seed layer 94, MR sensor 96, cap layer 98, first conductor/magnet structure 100, second conductor/magnet structure 102, and second gap layer 104.

Sensor seed layer 94 is formed on a central region of insulating first gap layer 92. MR sensor 96 is formed on sensor seed layer 94. Cap layer 98 is positioned on MR sensor 96.

First and second conductor/magnet structures 100 and 102 are arranged on end portions of gap layer 92 in an abutted-junction configuration on opposite sides of MR sensor 96. First and second conductor/magnet structures 100 and 102 function to provide current to MR sensor 96 and to provide longitudinal biasing to a sensing layer of MR sensor 96. Insulating second gap layer 104 is positioned over cap layer 98 and first and second conductor/magnet structures 100 and 102.

First conductor/magnet structure 100 is sequentially formed of bias seed layer 106, bias layer 108, and contact 110. Similarly, second conductor/magnet structure 102 is sequentially formed of bias seed layer 112, bias layer 114, and contact 116.

For transducing head 90 to operate correctly, the sensing layer of MR sensor 96 must be stabilized against the formation of edge domains since domain wall motion results in electrical noise that makes data recovery impossible. In transducing head 90, this stabilization is achieved with a permanent magnet abutted configuration in which bias layers 108 and 114 abut opposite sides of MR sensor 96 to provide longitudinal biasing to the sensing layer of MR sensor 96. This function requires that bias layers 108 and 114 have sufficient magnetic flux to provide a magnetic field adequate to magnetically stabilize and maintain in a single domain state the sensing layer of MR sensor 96. Specifically, bias layers 108 and 114 must have sufficiently high remnant magnetization ($M_r$) to stabilize the sensing layer of MR sensor 96 and sufficiently high resistance to demagnetization ($H_c$) to remain magnetized during its normal course of operation. Critical to meeting these requirements are the properties of bias seed layers 106 and 112. For this reason, when fabricating transducing head 90, bias layers 108 and 114 are deposited prior to contacts 110 and 116. This sequence allows for better control of the properties of bias seed layers 106 and 112. This arrangement of bias layers 108 and 114 beneath contacts 110 and 116 also allows for better longitudinal alignment of the sensing layer of MR sensor 96 with bias layers 108 and 114.

Difficulties have arisen with this prior art design, however, as a reader width of MR sensor 96 has decreased to accommodate ever increasing areal densities of magnetic media. Namely, this design has contributed to an increase in overall resistivity of transducing head 90 as the reader width has decreased. During fabrication of transducing head 90, prior to deposition of first and second conductor/magnet structures 100 and 102, a pattern of photoresist is deposited over cap layer 98 to define the width of MR sensor 96. This decrease in this width has required the reduction in a thickness of first and second conductor/magnet structures 100 and 102, and in particular, a thickness of contacts 110 and 116 to enable the removal of the photoresist pattern. This decrease in thickness of contacts 110 and 116 has resulted in an increase in overall resistivity of transducing head 90.

Thus, the present invention is a novel configuration of a transducing head's bias and conductor layers that allows for a reduction in overall resistivity of the transducing head while still sufficiently biasing an MR sensor of the transducing head. The present invention alters the structure of prior art transducing head 90 by improving upon first and second conductor/magnet structures 100 and 102. Specifically, first and second dual path conductor/magnet structures 20 and 22 of the present invention differ from that of prior art first and second conductor/magnet structures 100 and 102 in that the structure of present invention has bias layer 32 interspersed between first contact 28 and second contact 34 and bias layer 42 interspersed between first contact 38 and second contact 44. This configuration of the present invention thus allows for a path of low resistivity current flow adjacent MR sensor 16 and for a decrease in overall MR sensor resistivity, while still providing for sufficient stabilization of MR sensor 16.

A key element of the present invention is the recognition that bias layers 32 and 42 can be formed subsequent to first contacts 28 and 38 through the selection of a suitable materials for first contact seed layers 26 and 36 and bias seed layers 30 and 40. Bias layers 32 and 42 each preferably have a high resistance to thermal degradation, a coercivity ($H_c$) between about 1 kOe and about 5 kOe, and an in-plane remnant squareness (S), which is a ratio of remnant magnetization ($M_r$) to saturation magnetization ($M_s$), greater than about 0.8. To achieve these properties, first contact seed layers 26 and 36 and bias seed layers 30 and 40 preferably promote in respective bias layers 32 and 42 a crystallographic growth with the [0001] direction in the plane of bias layers 32 and 42. Without such careful selection of the materials for bias seed layers 30 and 40, it would be impossible to form bias layers 32 and 42 with the preferred properties. For instance, bias layers 32 and 42 will not properly perform if deposited over first contacts 28 and 38 formed of gold without careful selection of a suitable material for bias seed layers 30 and 40.

An additional advantage of the present invention is that overall resistivity of transducing head 10 is not as greatly affected during fabrication as that of prior art transducing head 90. A transducing head is typically formed by (a) depositing a plurality of layers that will form a MR sensor, (b) patterning a reader width of the MR sensor, (c) depositing a conductor/magnet structure on opposite sides of the MR sensor, and (d) defining a back edge of the MR sensor. During step (d), portions of the top-most layers in certain regions of the overall transducing head are often removed, causing an increase in overall resistivity of the transducing head.

Figure 6:
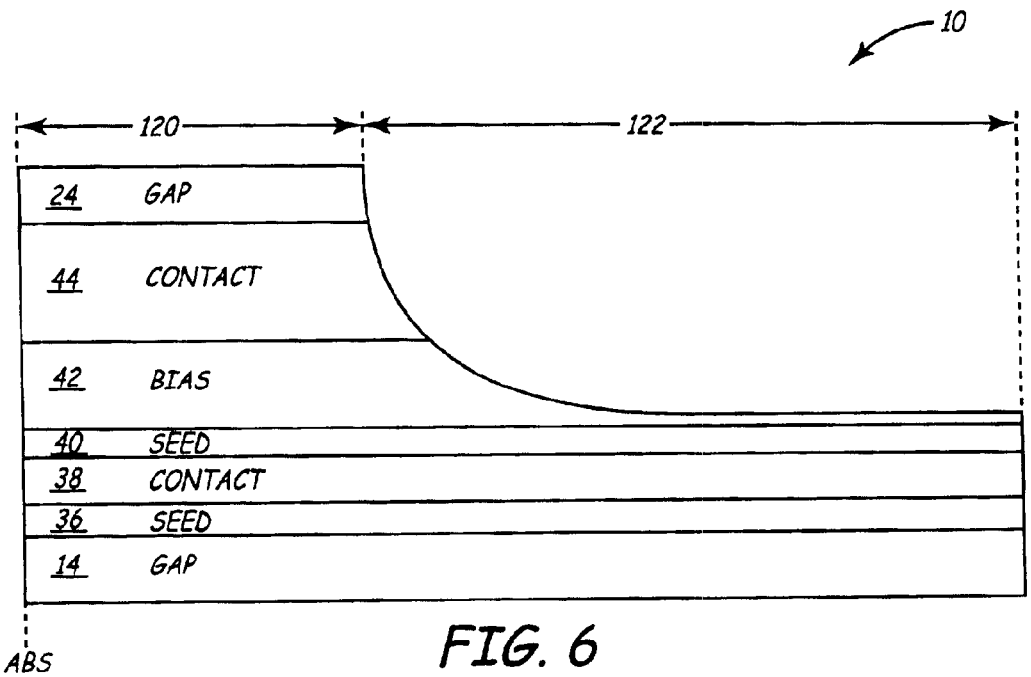
FIG. 6 is a cross-sectional view of the transducing head of FIG. 1 taken along cross-section VI—VI.
Figure 7:
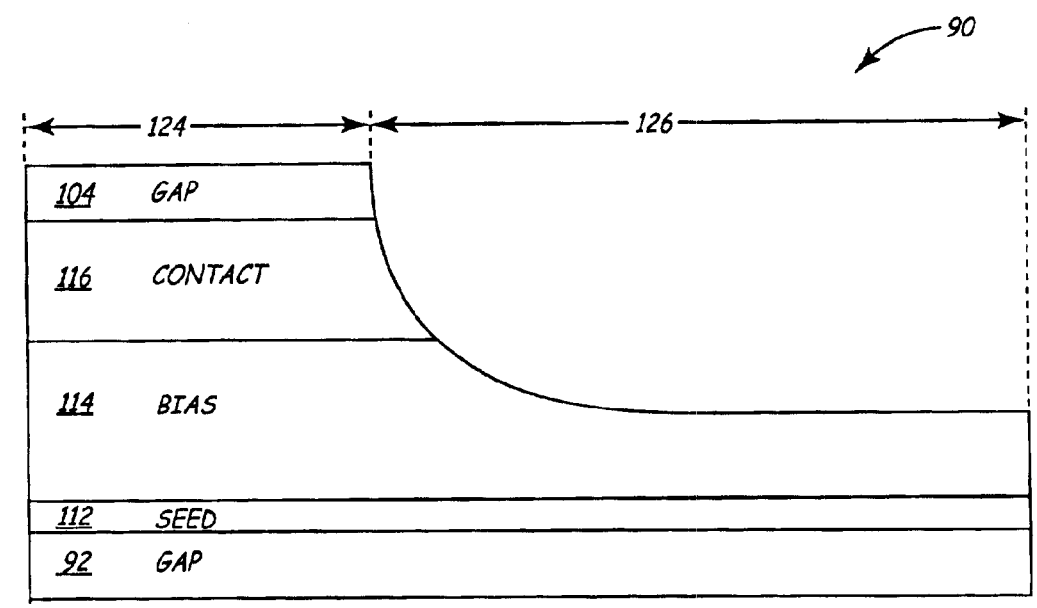
FIG. 7 is a cross-sectional view of the transducing head of FIG. 5 taken along cross-section VII—VII.

This reduction in thickness is illustrated in FIGS. 6 and 7. FIG. 6 is a cross-sectional view of transducing head 10 of FIG. 1 taken along cross-section VI—VI, and FIG. 7 is a cross-sectional view of prior art transducing head 90 of FIG. 5 taken along cross-section VII—VII. With prior art transducing head 90, the top-most layer of second conductor/magnet structure 102 is low-resistivity contact 116, which when thinned along portion 126, leaves only significantly higher resistivity bias layer 114 along portion 126. Conversely, with transducing head 10 of the present invention, the top-most layers are contact 44 and bias layer 42. During step (d), second contact 44 will be completely removed along portion 122, bias layer 42 will be thinned along portion 122, and low resistivity first contact 38 will not be thinned.

Figure 8:
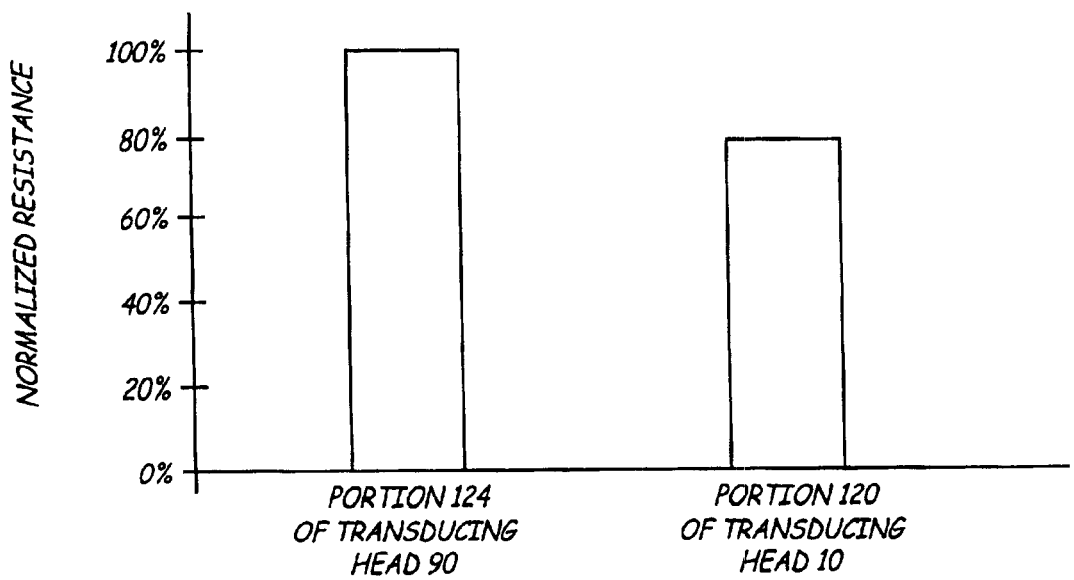
FIGS. 8 and 9 are charts comparing resistivity of the transducing head of FIG. 1 to the resistivity of the prior art transducing head of FIG. 5.
Figure 9:
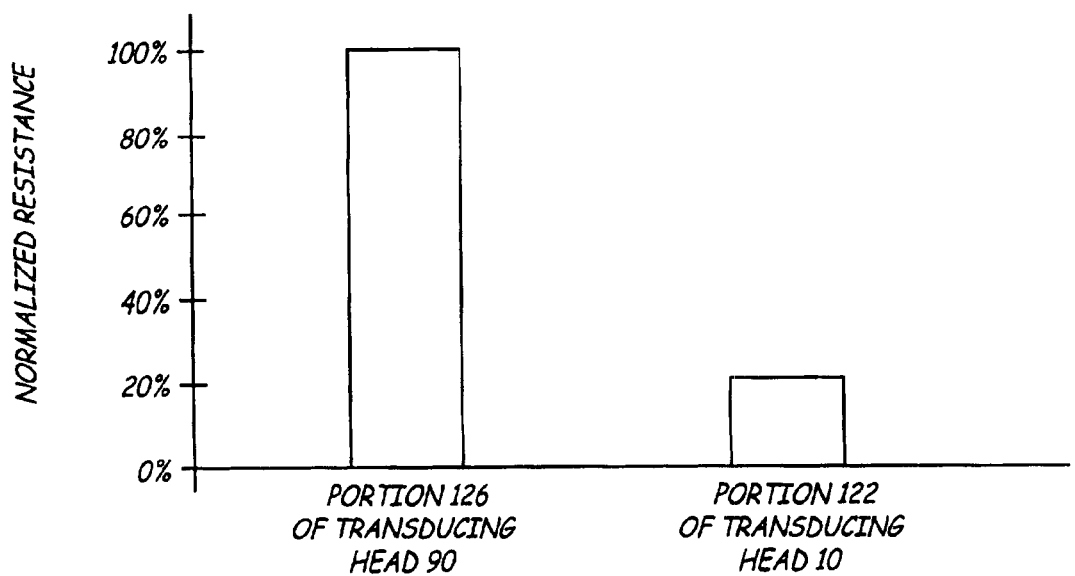

FIGS. 8 and 9 are charts comparing resistivity of transducing head 10 to the resistivity of prior art transducing head 90. As illustrated in FIG. 8, prior to application of step (d) described above, the resistivity of portion 120 (adjacent the air bearing surface) of transducing head 10 is about 80% that of portion 124 of prior art transducing head 90. More significantly, as illustrated in FIG. 9, after application of milling step (d), the resistivity of portion 122 (distant the air bearing surface) of transducing head 10 is about 20% that of portion 126 of prior art transducing head 90. The examples of FIGS. 8 and 9 are merely representative of a single embodiment of transducing heads 10 and 90. However, FIGS. 8 and 9 do illustrate that the dual-path conductor/magnet structure of the present invention has a significant impact on the resistivity of the transducing head in the region that has been milled to define the back edge of the transducing head.

Another advantage of the present invention is an increase in MR sensor signal strength. A pedestal of a transducing head is defined as those layers of the transducing head that elevate a bias layer of the transducing head. By using lower resistivity pedestals, an increase in current through the MR sensor can be achieved, thus increasing the MR sensor signal amplitude. In prior art transducing head 90, the pedestal for bias layer 42 is formed exclusively of bias seed layer 106. In contrast, in transducing head 10 of the present invention, the pedestal for bias layer 42 includes first contact seed layer 36, first contact 38 and bias seed layer 40. As the pedestal of transducing head 10 is formed primarily of relatively low resistivity first contact 38, it will have a substantially lower resistivity than the pedestal of prior art transducing head 90.

Figure 10:
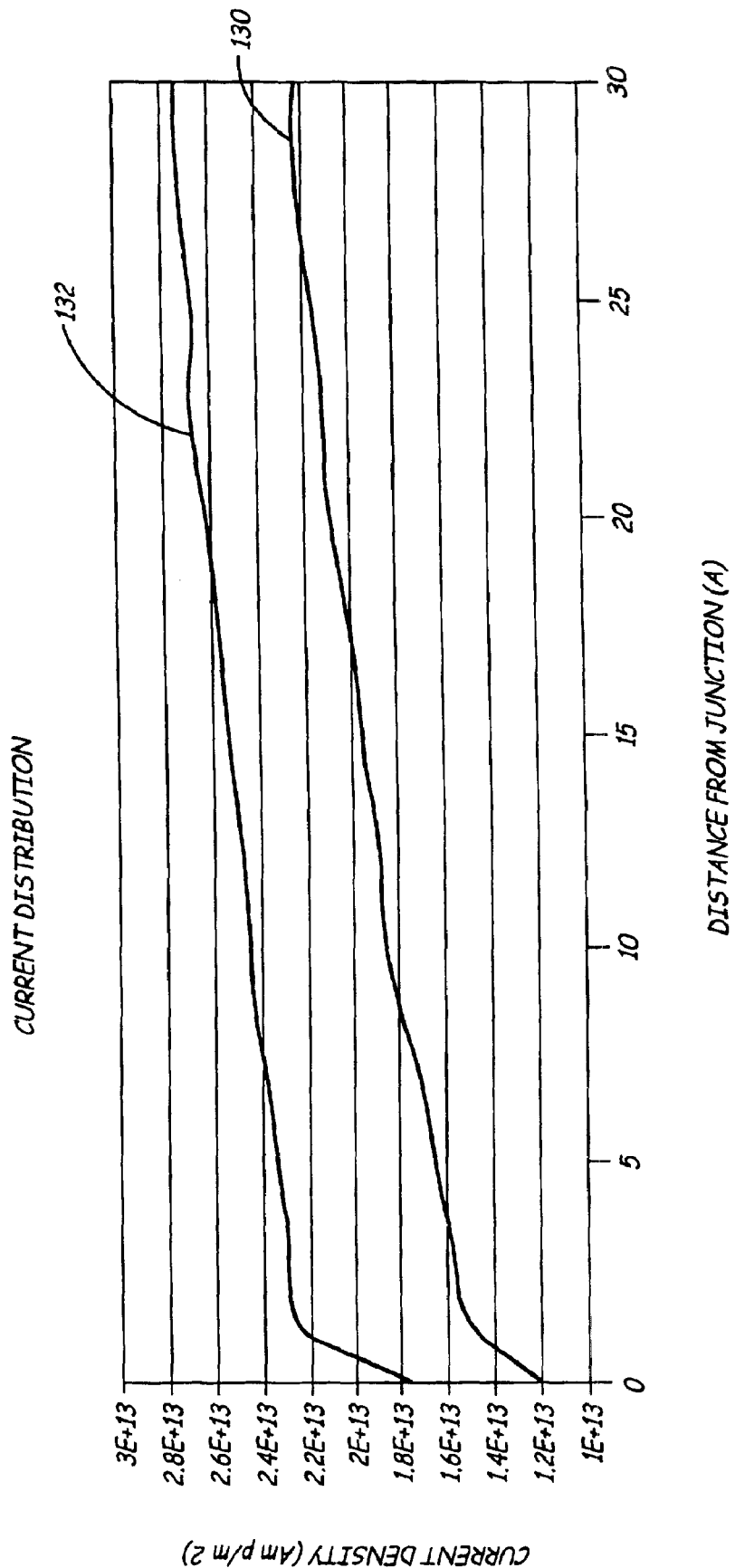
FIG. 10 is a graph comparing current distribution through a spacer layer of a spin valve sensor of a transducing head in accord with the present invention with current distribution through a spacer layer of a spin valve sensor of a prior art transducing head.

FIG. 10 is a graph illustrating current distribution through a spacer layer of spin valve sensor of a transducing head. Displayed on the horizontal axis is the first 30 Å, measured from an edge toward a center, of a 100 ÅA wide spin valve sensor. Displayed on the vertical axis is current density along the width of the spin valve sensor. Curve 130 illustrates current density in a spin valve sensor having relatively high resistivity pedestals, while curve 132 illustrates current density in a spin valve sensor having relatively low resistivity pedestals. As shown in FIG. 10, a greater amount of current flows through the spin valve sensor corresponding to the lower resistance pedestals of the present invention. Thus, the transducing head configuration of the present invention allows for greater read sensitivity.

Although the present invention has been described with reference to preferred embodiments, workers skilled in the art will recognize that changes may be made in form and detail without departing from the spirit and scope of the invention.

What is claimed is:

1. A transducing head comprising:
a first and a second dual path conductor/magnet structure each comprising a bias layer positioned between a first conductor layer and a second conductor layer and a bias seed layer upon which the bias layer is formed, the bias seed layer being selected to result in the bias layer having a coercivity between about 1 kOe and about 5 kOe and an in-plane remnant squareness greater than about 0.8; and
a magnetoresistive sensor positioned between the first and the second dual path conductor/magnet structures, the magnetoresistive sensor being formed of a plurality of layers that are each substantially parallel to the layers of the first and the second dual path conductor/magnet structures.

2. The transducing head of claim 1 wherein each of the first and the second dual path conductor/magnet structures further comprises:
a first conductor seed layer upon which the first conductor layer is formed.

3. The transducing head of claim 2 wherein the first conductor seed layers of the first and the second dual path conductor/magnet structures are each formed of at least one material selected from the group consisting of chromium, ruthenium, tantalum, titanium, tungsten, and alloys based primarily upon materials selected from the group consisting of chromium, ruthenium, tantalum, titanium, tungsten.

4. The transducing head of claim 1 wherein each of the first and the second dual path conductor/magnet structures further comprises:
a first conductor seed layer upon which the first conductor layer is formed; and
a second conductor seed layer upon which the second conductor layer is formed.

5. The transducing head of claim 1 wherein the first and the second conductor layers of the first and the second dual path conductor/magnet structures are each formed primarily of a material selected from the group consisting of chromium, copper, gold, rhodium, ruthenium, silver, tantalum, and tungsten.

6. The transducing head of claim 1 wherein the first conductor layers of the first and the second dual path conductor/magnet structures are each formed primarily of an alloy based upon materials selected from the group consisting of chromium, copper, gold, rhodium, ruthenium, silver, tantalum, and tungsten.

7. The transducing head of claim 1 wherein the bias layers of the first and the second dual path conductor/magnet structures are each formed primarily of a material selected from the group consisting of cobalt-chromium-platinum and cobalt-platinum.

8. The transducing head of claim 1 wherein the bias layers of the first and the second dual path conductor/magnet structures are each formed primarily of an alloy based upon a material selected from the group consisting of cobalt-chromium-platinum and cobalt-platinum.

9. The transducing head of claim 1 wherein the bias seed layers of the first and the second dual path conductor/magnet structures are each formed primarily of a material selected from the group consisting of chromium, ruthenium, tantalum, titanium, tungsten, and alloys based primarily upon materials selected from the group consisting of chromium, ruthenium, tantalum, titanium, and tungsten.

10. The transducing head of claim 1 wherein the bias seed layers of the first and the second dual path conductor/magnet structures are each formed of at least two layers.

11. A transducing head comprising:
a magnetoresistive sensor;
a first conductor layer positioned on a first side of the magnetoresistive sensor;
a second conductor layer positioned on a second side of the magnetoresistive sensor;
a first bias seed layer positioned over the first conductor layer and formed of a material selected from the group consisting of chromium, ruthenium, tantalum, titanium, tungsten and alloys based primarily on materials selected from the group consisting of chromium, ruthenium, tantalum, titanium, and tungsten;

a second bias seed layer positioned over the second conductor layer and formed of a material selected from the group consisting of chromium, ruthenium, tantalum, titanium, tungsten and alloys based primarily on materials selected from the group consisting of chromium, ruthenium, tantalum, titanium, and tungsten;

a first bias layer positioned over the first bias seed layer, wherein the first bias layer is formed of a hard magnetic material; and a second bias layer positioned over the second bias seed layer, wherein the second bias layer is formed of a hard magnetic material.

12. The transducing head of claim 11 and further comprising:

a third conductor layer positioned over the first bias layer; and a fourth conductor layer positioned over the second bias layer.

13. The transducing head of claim 11 wherein the first, the second, the third, and the fourth conductor layers are each formed of at least one material selected from the group consisting of copper, gold, rhodium, ruthenium, silver, tantalum, and tungsten.

14. The transducing head of claim 11 wherein the first and the second conductor layers are each formed primarily of an alloy based upon a material selected from the group consisting of copper, gold, rhodium, ruthenium, silver, tantalum, and tungsten.

15. The transducing head of claim 11 wherein the first and the second bias layers are each formed primarily of a material selected from the group consisting of cobalt-chromium-platinum and cobalt-platinum.

16. The transducing head of claim 11 wherein the first and the second bias layers are each formed primarily of an alloy based upon a material selected from the group consisting of cobalt-chromium-platinum and cobalt-platinum.

17. A transducing head comprising:

a spin valve sensor comprising a spacer layer positioned between a free layer and a pinned layer; and means for providing a current to the spin valve sensor and for stabilizing the free layer of the spin valve sensor, wherein the means comprises a first and a second structure each comprising a bias layer formed of a hard magnetic material positioned between a first conductor layer and a second conductor layer and a bias seed layer upon which the bias layer is formed, the first and the second structures being arranged in an abutted-junction configuration on opposite sides of the spin valve sensor.

18. A transducing head comprising:

a spin valve sensor comprising a spacer layer positioned between a free layer and a pinned layer; and means for providing a current to the spin valve sensor and for stabilizing the free layer of the spin valve sensor, wherein the means comprises a first and a second laminate structure comprising at least two conductor layers interspersed with at least one bias layer, wherein each bias layer is formed of a hard magnetic material, each bias layer being formed upon a bias seed layer formed of a material selected from the group consisting of tantalum, titanium-tungsten, and chromium, the first and the second laminate structures being arranged in an abutted-junction configuration on opposite sides of the spin valve sensor.

19. A transducing head comprising:

a spin valve sensor comprising a spacer layer positioned between a free layer and a pinned layer;

means for providing a current to the spin valve sensor and for stabilizing the free layer of the spin valve sensor, wherein the means comprises:

a first and a second conductor layer abutted with opposite sides of the spin valve sensor;

a first and a second bias seed layer abutted with opposite sides of the spin valve sensor and positioned above a respective one of the first and the second conductor layers; and a first and a second bias layer abutted with opposite sides of the spin valve sensor and positioned above a respective one of the first and the second bias seed layers, wherein the first and second bias layers are formed of a hard magnetic material.

* * * * *

UNITED STATES PATENT AND TRADEMARK OFFICE
CERTIFICATE OF CORRECTION

PATENT NO. : 6,954,343 B2  Page 1 of 1
APPLICATION NO. : 10/142563
DATED : October 11, 2005
INVENTOR(S) : David J. Larson et al.

It is certified that error appears in the above-identified patent and that said Letters Patent is hereby corrected as shown below:

On the Title page, Title (54) col. 1 line 3 after "MAGNETIC", insert --LAYER--

Signed and Sealed this

Twelfth Day of December, 2006

JON W. DUDAS
*Director of the United States Patent and Trademark Office*

UNITED STATES PATENT AND TRADEMARK OFFICE
CERTIFICATE OF CORRECTION

PATENT NO. : 6,954,343 B2  Page 1 of 1
APPLICATION NO. : 10/142563
DATED : October 11, 2005
INVENTOR(S) : David J. Larson et al.

It is certified that error appears in the above-identified patent and that said Letters Patent is hereby corrected as shown below:

On the Title Page, Title (54) Line 3, and Col. 1 line 3, after "MAGNETIC", insert --LAYER--

Signed and Sealed this

Second Day of January, 2007

JON W. DUDAS
*Director of the United States Patent and Trademark Office*